(12) United States Patent
Morita et al.

(10) Patent No.: US 11,453,357 B2
(45) Date of Patent: Sep. 27, 2022

(54) DRIVER'S SEAT AIRBAG APPARATUS FOR VEHICLES

(71) Applicant: Autoliv Development AB, Vargarda (SE)

(72) Inventors: Kazuki Morita, Kanagawa (JP); Yutaka Baba, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 15/734,101

(22) PCT Filed: May 14, 2019

(86) PCT No.: PCT/JP2019/019041
§ 371 (c)(1),
(2) Date: Dec. 1, 2020

(87) PCT Pub. No.: WO2019/235145
PCT Pub. Date: Dec. 12, 2019

(65) Prior Publication Data
US 2021/0221314 A1    Jul. 22, 2021

(30) Foreign Application Priority Data
Jun. 4, 2018 (JP) .............................. JP2018-106761

(51) Int. Cl.
*B60R 21/203* (2006.01)
*B60R 21/2338* (2011.01)
(Continued)

(52) U.S. Cl.
CPC ........ *B60R 21/203* (2013.01); *B60R 21/2338* (2013.01); *B60R 21/26* (2013.01);
(Continued)

(58) Field of Classification Search
CPC .............. B60R 21/203; B60R 21/2035; B60R 21/2338; B60R 21/26; B60R 2021/161; B60R 2021/23382
See application file for complete search history.

(56) References Cited

U.S. PATENT DOCUMENTS 7,360,791 B2 * 4/2008 Yamada ................ B60R 21/233
280/743.2
7,543,850 B2 * 6/2009 Bachraty ............... B60R 21/233
280/743.1
(Continued)

FOREIGN PATENT DOCUMENTS

| CN | 106515649 | 3/2017 |
| JP | H04-108457 | 9/1992 |

(Continued)

*Primary Examiner* — Laura Freedman
(74) *Attorney, Agent, or Firm* — Foley & Lardner LLP (57) ABSTRACT

In a driver's seat airbag apparatus for vehicles, which includes a driver airbag which is deployed and expanded from a hub region towards a driver's seat via the inner peripheral side of a rim of a steering wheel surrounding this hub region, the driver airbag is configured so as to include: a back panel which is attached and fixed to an inflator provided in the hub region, and a bag body which is provided so as to be bonded to this back panel and deployed and expanded from this back panel towards the driver's seat, and wherein the attachment center S of the inflator to this back panel is set with respect to the center P of the back panel so as to be close to the 6 o'clock direction side in the 12 o'clock direction and the 6 o'clock direction of the steering wheel.

9 Claims, 5 Drawing Sheets

(51) Int. Cl.
*B60R 21/26* (2011.01)
*B60R 21/16* (2006.01)

(52) U.S. Cl.
CPC .................. *B60R 2021/161* (2013.01); *B60R 2021/23382* (2013.01)

(56) References Cited

U.S. PATENT DOCUMENTS

| | | | | |
|---|---|---|---|---|
| 7,992,893 | B2* | 8/2011 | Choi | B60R 21/233 |
| | | | | 280/729 |
| 8,480,126 | B2* | 7/2013 | Higuchi | B60R 21/239 |
| | | | | 280/731 |
| 8,899,618 | B2* | 12/2014 | Eckert | B60R 21/231 |
| | | | | 280/731 |
| 9,688,229 | B2* | 6/2017 | Sekino | B60R 21/235 |
| 9,738,242 | B2* | 8/2017 | Ishiguro | B60R 21/239 |
| 9,902,359 | B2* | 2/2018 | Takeshita | B60R 21/231 |
| 10,507,781 | B2* | 12/2019 | Nakanishi | B60R 21/233 |
| 10,647,284 | B2* | 5/2020 | Koshikawa | B60R 21/231 |
| 10,919,483 | B2* | 2/2021 | Hotta | B60R 21/216 |
| 2018/0281731 | A1* | 10/2018 | Hotta | B60R 21/233 |

FOREIGN PATENT DOCUMENTS

| | | |
|---|---|---|
| JP | H05-82708 | 11/1993 |
| JP | H-09295546 | 11/1997 |
| JP | 2001-310696 | 11/2001 |
| JP | 2016-141279 | 8/2016 |
| JP | 2016-155456 | 9/2016 |
| JP | 2018-20737 | 2/2018 |
| JP | 2020142607 A * | 9/2020 |

* cited by examiner

PRIOR ART

DRIVER'S SEAT AIRBAG APPARATUS FOR VEHICLES

TECHNICAL FIELD

The present invention relates to a driver's seat airbag apparatus for vehicles which can prevent an airbag from rolling against the driver when the driver enters the deployed and expanded driver airbag.

BACKGROUND

As a driver's seat airbag apparatus for vehicles, for example, Patent Documents 1 and 2 are known. The "airbag apparatus" in Patent Document 1 aims to prevent an increase in the capacity of an airbag as much as possible so as to catch a passenger moving diagonally forward, wherein the airbag of a driver's seat airbag apparatus is configured by a passenger side panel and a non-passenger side panel. In a naturally expanded airbag, if the measurement between the fixed position of the airbag with respect to a fixing member and the most protruding part of the airbag with respect to this fixed position is set to 1, the maximum protruding part by way of the non-passenger side panel is disposed 0.5 or more apart from the fixed position, the expansion diameter of the intended part provided on the inner peripheral side of a wheel part is of a size 0.6 to 1.2-fold the inner diameter of the wheel part, and the expansion diameter at a bonding part between the passenger side panel and the non-passenger side panel is larger than the expansion diameter of the intended part provided on the inner peripheral side of the wheel part. In Patent Document 1, when pushed by the passenger, the airbag vibrates about the fixation point to the fixing member.

The "airbag apparatus" in Patent Document 2 aims to provide an airbag apparatus which can appropriately protect the passenger upon a diagonal collision of a vehicle, wherein the airbag apparatus includes: a first airbag which is deployed rearward from the steering wheel upon a diagonal collision; and a second airbag which is provided at the position below the steering shaft and deployed rearward and upward from the position upon a diagonal collision of the vehicle. The second airbag has an upward deployment part which passes through the side of the steering shaft and extends upward when deployed, wherein this upward deployment part is disposed between the side part of the deployed first airbag and the instrument panel. In Patent Document 2, a driver airbag serving as the first airbag is deployed rearward from the steering wheel.

RELATED ART DOCUMENTS

Patent Documents

Patent Document 1: JP 2016-141279 A
Patent Document 2: JP 2016-155456 A

SUMMARY OF THE INVENTION

Problem to be Solved by the Invention

Figure 7:
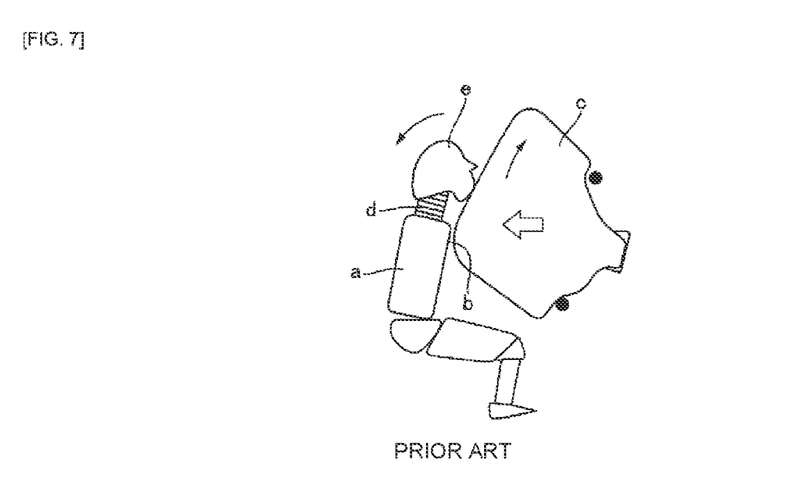
FIG. 7 is a schematic view describing the problems of the prior art.

In a driver's seat airbag apparatus for vehicles, when a driver seated in the driver's seat is caught by a deployed and expanded airbag, and the airbag vibrates with the entrance of the driver, for example, as illustrated in FIG. 7, an airbag c problematically rolls along the chest b of a driver a; in contrast, when this airbag c is lifted upward, the neck d and head e of the driver a are bent backward, problematically likely deteriorating an injury value.

In Patent Document 1, because the airbag vibrates about the fixation point, the airbag cannot be prevented from rolling. Moreover, Patent Document 2 does not take measures to prevent the driver airbag from rolling.

The present invention has been created in view of the abovementioned problems, with the object of providing a driver's seat airbag apparatus for vehicles which can prevent an airbag from rolling against the driver when the driver enters the deployed and expanded driver airbag.

Means for Solving the Problem

The driver airbag device of a vehicle according to the present invention is a driver's seat airbag apparatus for vehicles, including a driver airbag which is deployed and expanded from a hub region towards the drivers seat via the inner peripheral side of the rim of the steering wheel surrounding this hub region. Herein, the driver airbag is configured so as to include: a back panel which is attached and fixed to an inflator provided in the hub region, and a bag body which is provided so as to be bonded to this back panel and deployed and expanded from this back panel towards the driver's seat. The attachment center of the inflator at this back panel is set with respect to the center of the back panel so as to be close to the 6 o'clock direction side in the 12 o'clock direction and the 6 o'clock direction which is the vertical direction of the steering wheel.

The center of the back panel is preferably set on the center line of the deployed and expanded bag body which extends in the deployment and expansion direction. The center line on the inner peripheral side of the rim of the steering wheel preferably passes between the center of the back panel and the attachment center of the inflator.

The bag body is preferably configured so as to include: a front panel which faces the driver's seat; and a side panel which is formed into a hollow cylinder shape. Herein, one end thereof in the length direction is bonded to the front panel, while the other end thereof in the length direction is bonded to the back panel. When the bag body is deployed and expanded into the housing state, the side panel is capable of extending from this back panel towards the drivers seat side.

The driver airbag preferably includes a main tether which couples the front panel and the surrounding area of an inflator attachment part provided on the back panel. The main tether is preferably coupled to the surrounding area of the center part of the front panel, with the driver airbag preferably further including a sub tether which couples the halfway position of the main tether in the length direction and the surrounding area of the peripheral edge of the front panel.

Effect of the Invention

The drivers seat airbag apparatus for vehicles according to the present invention can prevent an airbag from rolling against the driver when the driver enters the deployed and expanded driver airbag.

EMBODIMENT OF THE INVENTION

Figure 1:
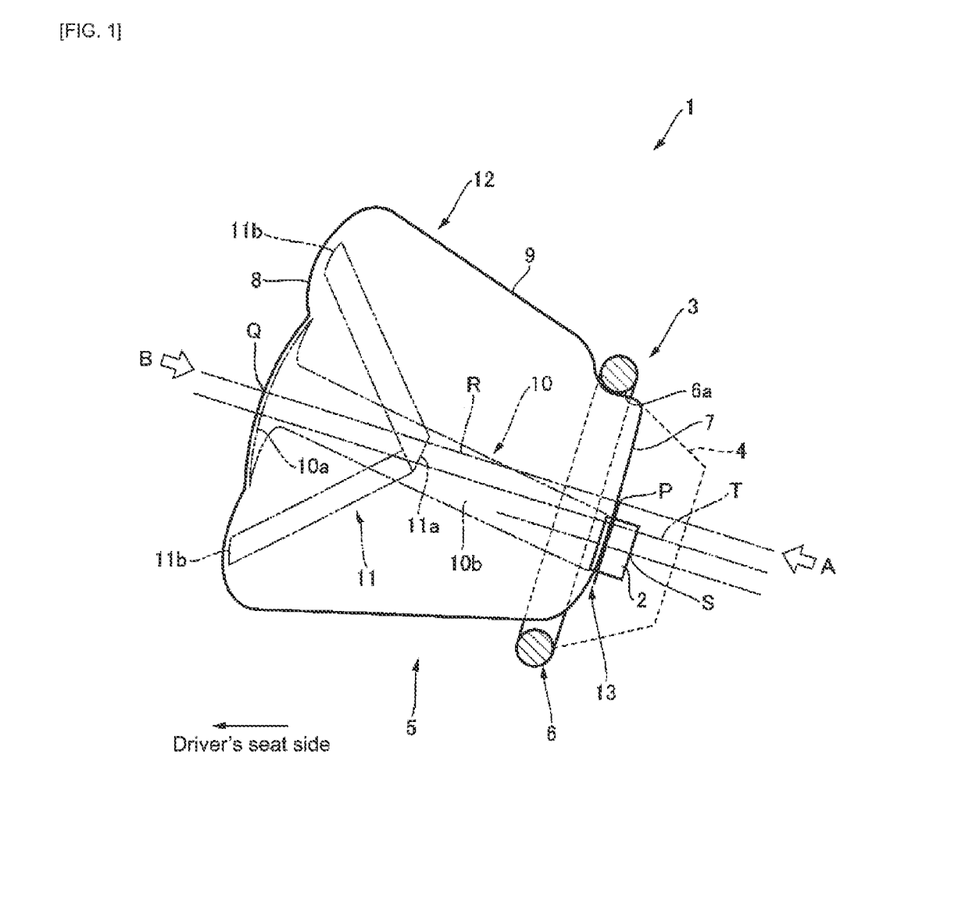
FIG. 1 is a side view from the width direction of the vehicle illustrating one preferred embodiment of a drivers seat airbag apparatus for vehicles according to the present invention.

One preferred embodiment of a driver's seat airbag apparatus for vehicles according to the invention will hereinafter be described in detail with reference to the accompanying drawings. As illustrated in FIG. 1, the driver's seat airbag apparatus 1 for vehicles according to the present embodiment is configured so as to include a driver airbag 5 which is deployed and expanded from a hub 4 region of a steering wheel 3 at the front in the anteroposterior direction of the vehicle towards the driver's seat side at the rear in the anteroposterior direction of the vehicle when inflator gas is introduced inside from an inflator 2.

As is well-known, the steering wheel 3 is configured by: the hub 4 serving as an attachment part to a steering shaft; a rim 6 having a circular ring shape, etc. surrounding the hub 4; and a spoke (not illustrated) coupling the rim 6 to the hub 4. Consequently, the hub 4 region is surrounded by the rim 6. The hub 4 region generally denotes the hub 4 as well as the area around this hub 4.

The inflator 2 is provided in the hub 4. The driver airbag 5 is attached to the inflator 2. The driver airbag 5 is provided on the hub 4 via the inflator 2. The driver airbag 5 introduces the inflator gas from the inflator 2, after which the gas passes through the inner peripheral side 6a of the rim 6 from the hub 4 region, and is deployed and expanded towards the driver's seat.

As illustrated in FIG. 1, when the driver airbag 5 is deployed and expanded, the airbag is configured into a truncated cone shape which is small and narrow on the rim 6 side and large and wide on the driver's seat side, that is, the airbag exhibits a horn shape as viewed from the width direction of the vehicle.

Figure 2:
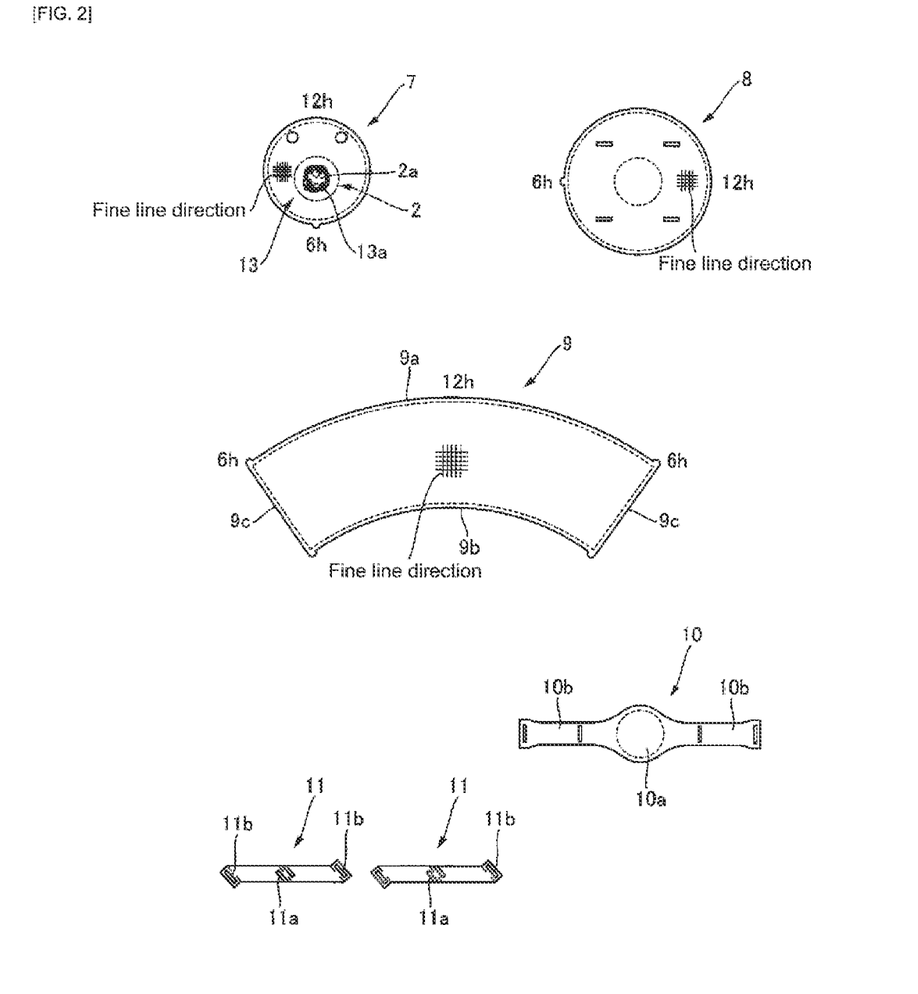
FIG. 2 is a component drawing of the drivers seat airbag apparatus for vehicles illustrated in FIG. 1.

As illustrated in FIG. 2, the driver airbag 5 is configured by: a back panel 7 on the hub 4 side; a front panel 8 facing the drivers seat when the driver airbag 5 is deployed and expanded; a side panel 9 which couples the front panel 8 and the back panel 7 to form a bag; a main tether 10; and a pair of sub tethers 11. In the following description, an assembly which is configured so as to include at least the front panel 8 and the side panel 9 with respect to the back panel 7 may be referred to as a bag body 12.

The back panel 7, the front panel 8, the side panel 9, the main tether 10, and the pair of sub tethers 11 are formed of a flexible material having poor stretchability, for example, a cloth material, etc. In the figure, in the case of the cloth material, a fine line is illustrated based on the 6 o'clock and 12 o'clock direction.

The back panel 7 configuring a truncated cone shaped top face has an outer diameter size smaller than the inner diameter size of the rim 6 and is formed into a nearly circular shape. The front panel 8 configuring a truncated cone shaped bottom face has an outer diameter size larger than the outer diameter size of the back panel 7 and the rim 6 and is formed into a nearly circular shape.

In order to form a truncated cone shaped peripheral side face, the side panel 9 is formed into a hollow cylinder shape. Herein, if the direction (in which the driver airbag 5 is deployed and expanded from the hub 4 side to the driver's seat side) is regarded as the length direction, one end thereof in the length direction is bonded to the peripheral edge of the front panel 8, while the other end thereof in the length direction is bonded to the peripheral edge of the back panel 7.

More specifically, the side panel 9 couples the front panel 8 and the back panel 7 such that, as viewed from the direction (arrow A direction in FIG. 1) in which the driver airbag 5 is deployed and expanded from the hub 4 side to the driver's seat side, the circular shaped center P of the back panel 7 is congruent with the circular shaped center Q of the front panel 8. As a result, the center P of the back panel 7 is set on the center line R of the deployed and expanded bag body 12 which extends in the deployment and expansion direction.

In other words, when the driver airbag 5 is deployed and expanded, the truncated cone shaped center line R (wherein, the side panel 9 serves as the peripheral side face, the top face serves as the back panel 7, and the bottom face serves as the front panel 8) is set so as to pass through the center P of the back panel 7 and the center Q of the front panel 8.

As illustrated in FIG. 2, in the state prior to assembly, a hollow cylinder shaped side panel 9 is formed into an arch shaped belt, the rear end edge 9a bonded to the front panel 8 is formed so as to have the same size as the peripheral length of this front panel 8, while the front end edge 9b bonded to the back panel 7 is formed so as to have the same size as the peripheral length of this back panel 7. The side panel 9 is formed into a hollow cylinder shape (hollow truncated cone shape) by bonding both side edges 9c.

The driver airbag 5 is configured such that as mentioned later, after the tethers 10, 11 are incorporated, one end (rear end edge) of the side panel 9 in the length direction is bonded to the front panel 8, while the other end (front end edge) thereof in the length direction is bonded to the back panel 7.

The driver airbag 5 is brought into the housing state by folding the bag body 12 into a small shape with respect to the back panel 7. When the side panel 9 is deployed and expanded from the housing state by the inflator gas which is introduced into the driver airbag 5, the panel is configured so as to be able to extend from the back panel 7 side towards the driver's seat side.

An inflator attachment part 13 is provided on the back panel 7, with the inflator 2 attached to this inflator attachment part 13 via a fastening member (not illustrated). As illustrated in FIG. 2, a hole part 13a for inserting a gas ejection part 2a of the inflator 2 is formed in the inflator attachment part 13.

When the back panel 7 is attached and fixed to the inflator 2 (provided in the hub 4 region) via the inflator attachment part 13, the back panel 7 is provided so as to be fixed to the hub 4. As a result, the overall driver airbag 5 including the bag body 12 which is deployed and expanded from the back panel 7 towards the driver's seat is attached and fixed to the hub 4 of the steering wheel 3.

Figure 3:
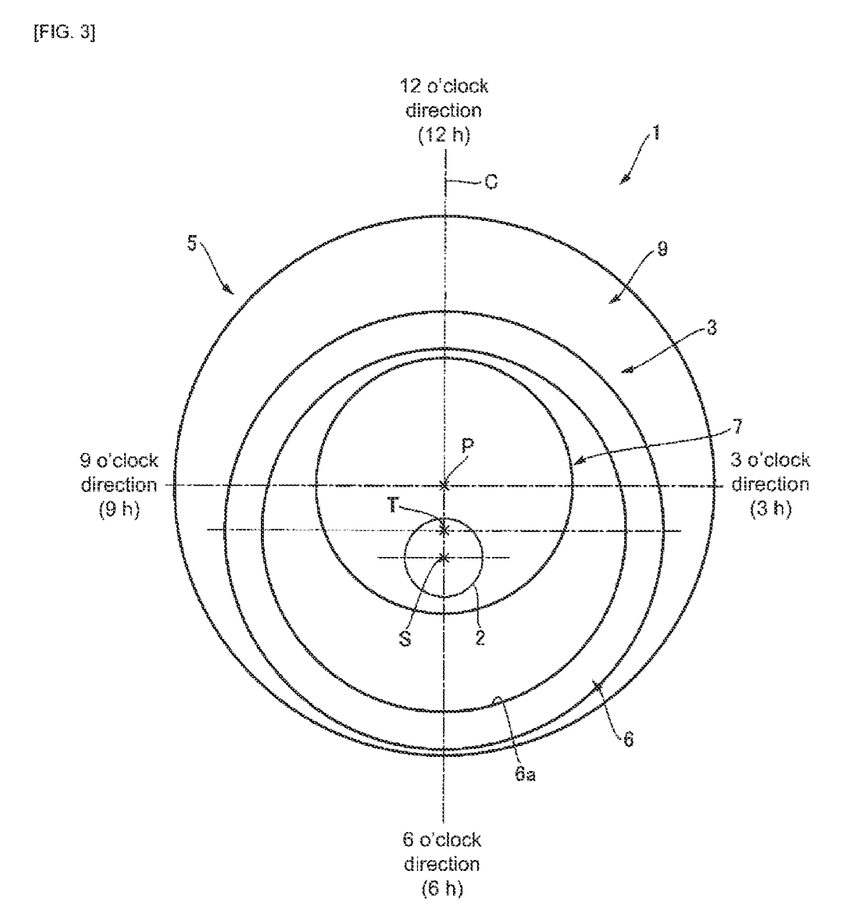
FIG. 3 is a view in the arrow direction along line A in FIG. 1.

Regarding the vertical direction of the steering wheel 3, ordinarily, the upward direction is referred to as the 12 o'clock direction, the right direction as the 3 o'clock direction, the downward direction as the 6 o'clock direction, and the left direction as the 9 o'clock direction. As illustrated in FIGS. 1 and 3, the attachment center S of the inflator 2 to the back panel 7 is set with respect to the center P of the back panel 7 so as to be close to the 6 o'clock direction in the 12 o'clock direction and the 6 o'clock direction (vertical direction) of the steering wheel 3.

Consequently, with respect to the center line R of a truncated cone shaped bag body 12 (side panel 9), the attachment center S of the inflator 2 is similarly disposed so as to be shifted in the 6 o'clock direction.

Further, in the deployment and expansion direction of the driver airbag 5, the center line T, which is parallel to the center line R of the bag body 12 and passes through the center of the inner peripheral side 6a of the rim 6 of the steering wheel 3, is set so as to pass between the center P of the back panel 7 and the attachment center S of the inflator 2.

That is, as understood by viewing FIG. 3, in the vertical direction axis line C which is directed from the 12 o'clock direction of the steering wheel 3 to the 6 o'clock direction thereof, as viewed from the deployment and expansion direction (arrow A direction in FIG. 1) of the driver airbag 5, the positional relationship is set such that the center P of the back panel 7 is disposed by shifting upward the center T of the rim 6, while the attachment center S of the inflator 2 is disposed by shifting downward the center T of the rim 6.

When at least the bag body 12 finishes being deployed and expanded, the outer diameter size of the side panel 9 is set to a size which is abutted by the inner peripheral side 6a of the rim 6 in the 12 o'clock direction of the steering wheel 3 (even prior to finishing being consequently deployed and expanded) and does not contact the rim 6 in the 6 o'clock direction.

That is, when the center P of the back panel 7 which passes through the center line R of the bag body 12 is shifted to the 12 o'clock side with respect to the center T of the rim 6, the bag body 12 abuts the rim 6 of the side panel 9.

The main tether 10 and the pair of sub tethers 11, which configure the driver airbag 5, are provided in order to control the expansion form and the deployment and expansion completing position of the driver airbag 5. As illustrated in FIG. 2, the main tether 10 in a component form is configured by: a center part 10a exhibiting a circular shape; and a pair of left and right strip parts 10b extending from the center part 10a to both sides thereof in the diameter direction.

Figure 4:
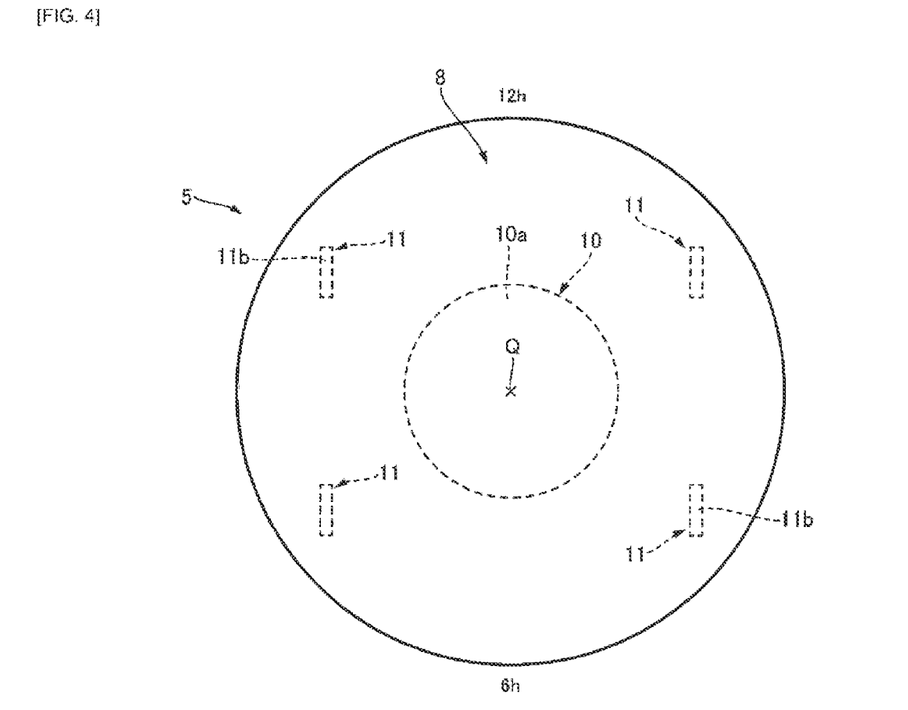
FIG. 4 is a view in the arrow direction along line B in FIG. 1.

As illustrated in FIGS. 1 and 4, the main tether 10 is configured such that the center part 10a is bonded to the surrounding area of the middle part of the front panel 8. The pair of left and right strip parts 10b of the main tether are bonded to the back panel 7 which is disposed on both the left and right sides of the inflator 2 in the surrounding area of the inflator attachment part 13. As a result, the main tether 10 is provided so as to be coupled between the surrounding area of the inflator attachment part 13 of the back panel 7 and the surrounding area of the middle part of the front panel 8 in the deployment and expansion direction of the driver airbag 5. The surrounding area of the middle part of the front panel 8 denotes the region including the middle part and periphery of the front panel 8, while the surrounding area of the inflator attachment part 13 denotes the peripheral region around the inflator attachment part 13.

The pair of sub tethers 11 are provided on each of both the left and right sides of the main tether 10, and as illustrated in FIG. 2, are formed into a belt shape which has a center bonding part 11a at an intermediate part in the length direction as well as a pair of end bonding parts 11b at both end parts in the length direction. The sub tethers 11 are used such that the end bonding parts 11b are forked with respect to the center bonding part 11a.

The center bonding part 11a of each sub tether 11 is bonded to the halfway position of each of the pair of left and right the strip parts 10b of the main tether 10 in the length direction, and is provided on both the left and right sides of the main tether 10. The pair of end bonding parts 11b of each sub tether 11 are bonded to two positions spaced apart from each other in the vertical direction, in the surrounding area of the peripheral edge outside the middle part of the front panel 8 (region including the peripheral edge of the front panel 8 and the periphery thereof).

As a result, as illustrated in FIGS. 1 and 4, the pair of left and right sub tethers 11 are provided so as to couple the halfway position (of each of the left and right strip parts 10b of the main tether 10 which bonds the center bonding part 11a) and four positions (on the peripheral edge side of the front panel 8 which bonds the pair of end bonding parts 11b vertically forked from the center bonding part 11a) diagonally in the deployment and expansion direction.

When the driver airbag 5 is deployed and expanded by the inflator gas, tension pulling the middle part of the front panel 8 from the back panel 7 side is generated in the main tether 10, while tension pulling the peripheral edge side of the front panel 8 from the main tether 10 side is generated in the sub tethers 11. Herein, these tensions regulate the driver airbag 5 from protruding and control the expansion form and the deployment and expansion completing position of the front panel 8.

The mode of operation of the driver's seat airbag apparatus 1 for vehicles according to the present embodiment will hereinafter be described. When the inflator 2 is operated to allow the inflator gas to be introduced from the gas ejection part 2a into the driver airbag 5, the bag body 12 which is folded, etc. and brought into the housing state starts being loosened from the hub 4 region with the back panel 7 serving as the base part.

The loosened bag body 12 passes through the inner peripheral side 6a of the rim 6 and is deployed and expanded towards the driver's seat side.

In the process in which the bag body 12 is gradually filled with the inflator gas and deployed and expanded, the side panel 9 swells not only in the deployment and expansion direction which is directed towards the rear of the vehicle of the bag body 12, but also in a manner in which the diameter of the truncated cone shape of the bag body 12 increases.

Because the attachment center S of the inflator 2 for introducing the inflator gas is disposed so as to be closer to the 6 o'clock side than the center P of the back panel 7, the bag body 12 (which swells as the diameter of the truncated cone shape increases) can rise upward to the 12 o'clock direction (compared with the case in which the center P of the back panel 7 is congruent with the attachment center S of the inflator 2), enabling the expansion position of the side panel 9 to be close to the 12 o'clock direction side of the steering wheel.

Moreover, because the center line T of the inner peripheral side 6a of the rim 6 of the steering wheel 3 is set so as to pass between the center P of the back panel 7 and the attachment center S of the inflator 2, the expansion position of the side panel 9 can be closer to the 12 o'clock direction of the steering wheel 3 (compared with the case in which the center line T of the inner peripheral side 6a of the rim 6 is set so as to pass through the center P of the back panel 7).

Figure 5:
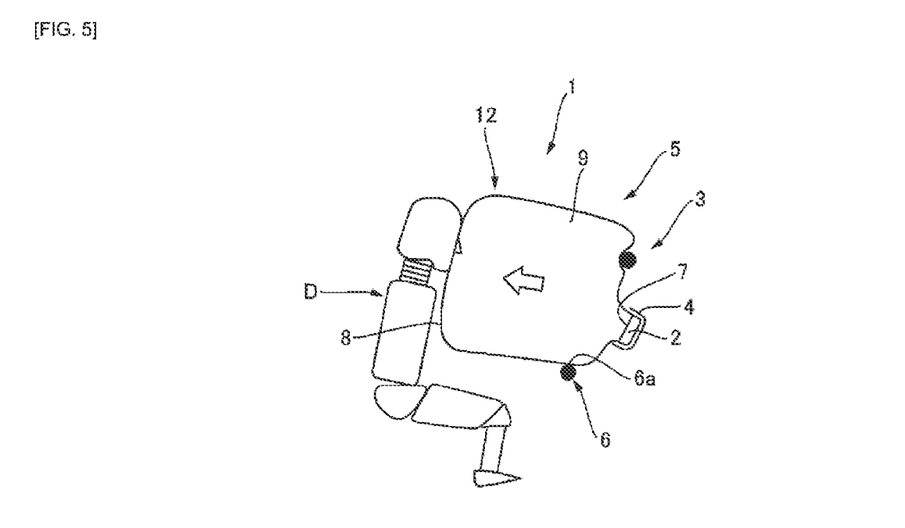
FIG. 5 is a schematic view describing a mode of operation of the driver's seat airbag apparatus for vehicles illustrated in FIG. 1.

As a result, as illustrated in FIGS. 1 and 5, the side panel 9 abuts the rim 6 in the 12 o'clock direction of the steering wheel 3.

Moreover, because the center P of the back panel 7 is set on the center line R of the deployed and expanded bag body 12 which extends in the deployment and expansion direction, the side panel 9 can assuredly abut the rim 6.

In contrast, in the 6 o'clock direction of the steering wheel 3, the side panel 9 does not contact the rim 6, or slightly contacts the rim 6, and passes thereabove.

When the bag body 12 is filled with the inflator gas and finishes being employed and expanded while protruding towards the drivers seat side, the tension which pulls the front panel 8 is applied to the main tether 10 and the pair of sub tethers 11, stabilizing the expansion form and the deployment and expansion completing position of the driver airbag 5.

When the deployment and expansion form is stable, the side panel 9 has already been deformed along this rim 6 such that the rim 6 encroaches in the 12 o'clock direction of the steering wheel 3 and the bag body 12 is restrained by the rim 6, thereby regulating the movement thereof.

As illustrated in FIG. 5, when a driver D seated in the driver's seat is caught by the bag body 12, the driver airbag 5 abuts the rim 6 in response to the entrance of the driver D, enabling this driver airbag 5 to be restrained from moving.

Because the immobilization by the rim 6 allows the driver airbag 5 to be restrained from moving, for example, the bag body 12 can be prevented from rolling along the chest of the driver D.

Because the bag body 12 can be prevented from rolling, the deterioration of the injury value such as backbending of the neck and head of the driver D can be prevented in order to appropriately improve the passenger protection performance.

Because the bag body 12 is configured only by the front panel 8 and a hollow cylinder shaped side panel 9, the shape of the side panel 9 can be set so as to easily and assuredly abut the rim 6.

Because the main tether 10 and the sub tethers 11 for controlling the expansion form and the deployment and expansion completing position are incorporated into the driver airbag 5, the bag body 12 can be appropriately deployed and expanded, further assuredly allowing the bag body 12 to abut the rim 6.

Figure 6:
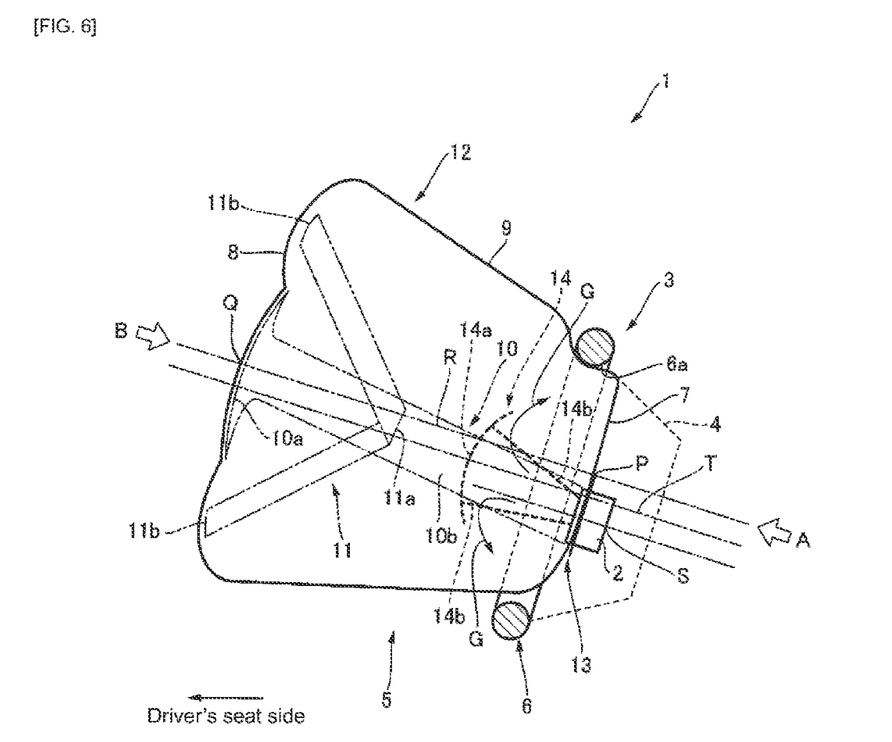
FIG. 6 is a side view from the width direction of the vehicle illustrating a modified example of a drivers seat airbag apparatus for vehicles according to the present invention.

FIG. 6 illustrates a modified example according to the abovementioned embodiment. In this modified example, a diffuser 14 for controlling the flow of the inflator gas introduced from the inflator 2 is provided inside the driver airbag 5. The diffuser 14 is disposed between the inflator 2 and the front panel 8 so as to face the inflator 2 (when the driver airbag 5 is deployed and expanded) in the orientation of the center line R extending in the deployment and expansion direction of the bag body, and is configured by: a receiving surface 14a receiving the inflator gas which is introduced so as to blow out from the inflator 2; and multiple band shaped coupling members 14b. Herein, one end thereof is coupled to the edge of the receiving surface 14a, while the other end thereof is directly or indirectly coupled to the inflator 2. The multiple coupling members 14b are provided at intervals along the edge of the receiving surface 14a.

For example, the diffuser 14 is formed of the same material as the back panel 7, etc. The receiving surface 14a of the diffuser 14 is molded into a circle shape, while the coupling members 14b coupled to the inflator 2 regulate the receiving surface 14a from moving towards the front panel 8 side. As a result, the diffuser 14 is abutted by the inflator gas so as to spread in a parachute shape, guiding the inflator gas abutted by the receiving surface 14a to flow into the driver airbag 5 from between the coupling members 14b (see the arrow G in the figure).

When the inflator gas is introduced from the inflator 2 into the driver airbag 5, the inflator gas abuts the receiving surface 14a of the diffuser 14 before being filled throughout the driver airbag 5. At this time, the receiving surface 14a of the diffuser 14 is curved like a parachute and pulled from the inflator 2 side by the coupling members 14b, thereby forming radially extending recesses and projections on the receiving surface 14a. That is, as understood from the open state of the parachute, the edge part in the receiving surface 14a in which the coupling members 14b are not coupled forms a horizontal passage with respect to the receiving surface 14a, in the form of projections from the edge to which the coupling members 14b are coupled. This horizontal passage is radially arranged on the receiving surface 14a. The inflator gas which has abutted the receiving surface 14a flows into the driver airbag 5 along a horizontal passage radially arranged from the center of the receiving surface 14a.

As a result, the driver airbag 5 can be quickly deployed along the plane (the plane to which the center line R (extending in the deployment and expansion direction of the bag body) is orthogonal) along the rim 6 at the initial stage of deployment, enabling the driver airbag 5 to quickly enter gaps between the chest and the waist of the driver and to restrain the driver over a wide area, even when the driver approaches the steering wheel 3. Moreover, because the pressure directed directly to the driver side by the expanded driver airbag 5 is temporarily received by the receiving surface 14a of the diffuser 14, the injury value to the driver can be minimized. Needless to say, in such modification examples as well, the same effects as those of the abovementioned embodiments are achieved.

The hub 4 described in the abovementioned embodiments may be either a type of hub which rotates with the operation of the steering wheel 3 or a fixed hub which does not rotate.

While the truncated cone shaped bag body 12 as the bag body 12 has been illustrated in the abovementioned embodiments, a truncated pyramid shaped bag body may also be used. The shape of the back panel 7 and the front panel 8 are not limited to a circular shape, but may be a polygonal shape, etc. In this case, the centers P, Q may be the centroids of the outer shapes of these panels 7, 8.

The driver's seat side airbag apparatus for vehicles described above is the preferred example of the invention, and embodiments other than those described may also be implemented or executed via a variety of methods. In particular, unless otherwise described in the specification of the application, the invention is not restricted to the shapes, sizes, configurational dispositions, and the like of the parts illustrated in detail in the accompanying drawings. In addition, the expressions and terms used in the specification of the application are used for providing a description, without limiting the invention thereto, unless specifically described otherwise.

EXPLANATION OF CODES

1 Driver's seat airbag apparatus for vehicles
2 Inflator
3 Steering wheel
4 Hub
5 Driver airbag
6 Rim 6a Inner peripheral side of the rim
7 Back panel
8 Front panel
9 Side panel
10 Main tether
11 Sub tether
12 Bag body
13: Inflator attachment part
P Center of the back panel
R Center line extending in the deployment and expansion direction of the bag body
S Attachment center of the inflator
T Central line on the inner peripheral side of the T rim

The invention claimed is:

1. A driver's seat airbag apparatus for vehicles, comprising:
a driver airbag which is deployed and expanded from a hub region towards a driver's seat via an inner peripheral side of a rim of a steering wheel surrounding the hub region, wherein:
the driver airbag is configured so as to comprise: a back panel which is attached and fixed to an inflator provided in the hub region, and a bag body which is provided so as to be bonded to the back panel and deployed and expanded from the back panel towards the driver's seat, and
an attachment center of the inflator to the back panel is set with respect to a center of the back panel so that the attachment center is closer to a bottom of the rim of the steering wheel than to a top of the rim of the steering wheel,
wherein an upper surface of the driver airbag abuts the inner peripheral side of the top of the rim and a bottom surface of the driver airbag does not abut the inner peripheral side of the bottom of the rim.

2. The driver's seat airbag apparatus for vehicles according to claim 1, wherein the center of the back panel is set on a center line of the deployed and expanded bag body which extends in a deployment and expansion direction.

3. The driver's seat airbag apparatus for vehicles according to claim 1, wherein a center line on the inner peripheral side of the rim of the steering wheel passes between the center of the back panel and the attachment center of the inflator.

4. The driver's seat airbag apparatus for vehicles according to claim 1, wherein the bag body is configured so as to include: a front panel which faces the driver's seat; and a side panel which is formed into a hollow cylinder shape, wherein one end thereof in a length direction is bonded to the front panel, while the other end thereof in the length direction is bonded to the back panel, and wherein, when the bag body is deployed and expanded from a housing state, the side panel is capable of extending from the back panel towards a driver's seat side.

5. The driver's seat airbag apparatus for vehicles according to claim 4, wherein the driver airbag comprises a main tether which couples the front panel and a surrounding area of an inflator attachment part provided on the back panel.

6. The driver's seat airbag apparatus for vehicles according to claim 5, wherein the main tether is coupled to a surrounding area of a center part of the front panel, wherein the driver airbag further comprises a sub tether which couples a halfway position of the main tether in a length direction and a surrounding area of a peripheral edge of the front panel.

7. The driver's seat airbag apparatus for vehicles according to claim 1, wherein the bottom surface of the driver airbag is configured to abut the inner peripheral side of the bottom of the rim after a driver is caught by the driver airbag.

8. A driver's seat airbag apparatus for vehicles, comprising:
a driver airbag which is deployed and expanded from a hub region towards a driver's seat via an inner peripheral side of a rim of a steering wheel surrounding the hub region, wherein:
the driver airbag is configured so as to comprise: a back panel which is attached and fixed to an inflator provided in the hub region, and a bag body which is provided so as to be bonded to the back panel and deployed and expanded from the back panel towards the driver's seat,
an attachment center of the inflator to the back panel is set with respect to a center of the back panel so that the attachment center is closer to a bottom of the rim of the steering wheel than to a top of the rim of the steering wheel,
the center of the back panel is set on a center line of the deployed and expanded bag body which extends in a deployment and expansion direction, and
a center line on the inner peripheral side of the rim of the steering wheel passes between the center of the back panel and the attachment center of the inflator,
wherein an upper surface of the driver airbag abuts the inner peripheral side of the top of the rim and a bottom surface of the driver airbag does not abut the inner peripheral side of the bottom of the rim.

9. A driver's seat airbag apparatus for vehicles, comprising:
a driver airbag which is deployed and expanded from a hub region towards a driver's seat via an inner peripheral side of a rim of a steering wheel surrounding the hub region, wherein:
the driver airbag is configured so as to comprise: a back panel which is attached and fixed to an inflator provided in the hub region, and a bag body which is provided so as to be bonded to the back panel and deployed and expanded from the back panel towards the driver's seat,
an attachment center of the inflator to the back panel is set with respect to a center of the back panel so that the attachment center is closer to a bottom of the rim of the steering wheel than to a top of the rim of the steering wheel,
the center of the back panel is set on a center line of the deployed and expanded bag body which extends in a deployment and expansion direction, and
the bag body is configured so as to include: a front panel which faces the driver's seat; and a side panel which is formed into a hollow cylinder shape, wherein one end thereof in a length direction is bonded to the front panel, while the other end thereof in the length direction is bonded to the back panel, and wherein, when the bag body is deployed and expanded from a housing state, the side panel is capable of extending from the back panel towards a driver's seat side,
wherein an upper surface of the side panel abuts the inner peripheral side of the top of the rim and a bottom surface of the side panel does not abut the inner peripheral side of the bottom of the rim.

* * * * *